SIGN ANTICIPATING CIRCUITRY PERFORMING BINARY MULTIPLICATION BY SUCCESSIVE ADDITIONS EMPLOYING ONES COMPLEMENT ROTATION

Filed Dec. 14, 1966 4 Sheets-Sheet 1

INVENTORS
DAVID M. COLLINS
GARY J. IVERSON
BY Charles A. Johnson
ATTORNEY

| OPERAND SIGNS (Q) | OPERAND SIGNS (y) | PRODUCT SIGN | MULTIPLICAND SIGN (XØ) | OPERAND FORM GATED TO (XØ) |
|---|---|---|---|---|
| + | + | + | + | (y) |
| + | − | − | − | (y) |
| − | + | − | − | ($\bar{y}$) |
| − | − | + | + | ($\bar{y}$) |

3,519,809

SIGN ANTICIPATING CIRCUITRY PERFORMING BINARY MULTIPLICATION BY SUCCESSIVE ADDITIONS EMPLOYING ONES COMPLEMENT ROTATION

Gary J. Iverson, White Bear Lake, and David M. Collins, St. Paul Park Village, Minn., assignors to Sperry Rand Corporation, New York, N.Y., a corporation of Delaware Filed Dec. 14, 1966, Ser. No. 601,754
Int. Cl. G06f 7/39
U.S. Cl. 235—164 7 Claims

ABSTRACT OF THE DISCLOSURE

This invention relates to improved multiply circuitry, and the disclosure describes circuitry for anticipating the appropriate algebraic sign of the product of a pair of signed operands, i.e. binary numbers. The circuitry assures than an end-correction of the sign or magnitude of the product is never necessary. Further, circuitry is described whereby it is unnecessary to complement more than one of the operands. This is accomplished without additional time being required for the total multiply operation, since it is accomplished during the transmittal of the operand from memory to the multiply circuitry.

INTRODUCTION

Figure 1:
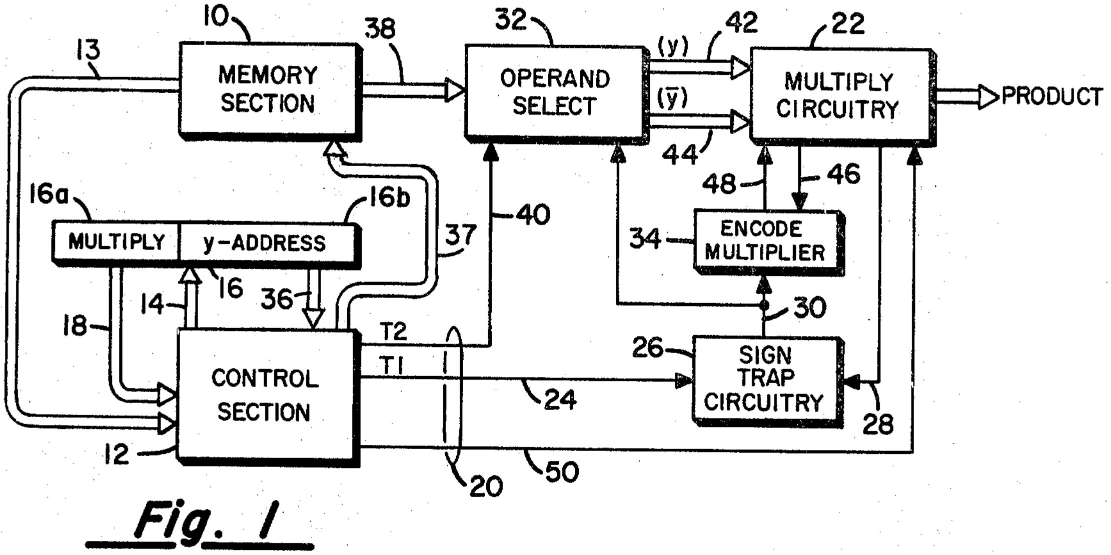

In the data processing art, the emphasis in the past has been on achieving faster and faster computational rates. This goal has been achieved by various techniques. In a binary number system data processing machine, the performance of a multiply operation is normally accomplished by a series of iterative cycles wherein a partial product is generated during each of the iterative cycles and added to the previous sum of the partial products. When the predetermined number of iterative cycles have been completed, the end product is available. When the data processing system is required to handle both positive and negative operands, it has been the general rule that an end-correction cycle is required for adjusting the sign and/or the magnitude indicated as the correct product. This arises from calculation system format and constraints which are normally utilized in the arithmetic operation. Prior art devices which provide extremely fast binary multiply operation are shown in the Cochran et al. Pat. No. 3,192,366, and in the Oman Pat. No. 3,192,367, both issued June 29, 1965. These patents are assigned to the assignee of this invention. Both of these patents describe multiply apparatus wherein more than one multiplier digit is sensed simultaneously. The partial products developed are added in pairs. In both of these patents, an end-correction cycle is necessary. It can readily be seen that the rate at which the multiply operation can be completed could be increased by eliminating the need of this end-correction cycle. It will also be noted that for various combinations of signed operands it is necessary that both operands be complemented as a part of the initial setup of the multiply operation. Again, precious time is utilized in this complementing operation and it can be seen that the multiply rate can be enhanced by providing a system in which only one of the operands at the most need be complemented and that this complementing is done on the fly as the operand is brought in from the memory.

The primary object of the invention of providing a multiply apparatus which does not require an end-correction cycle, is accomplished by providing means for trapping the sign of the multiplier and operand select means responsively coupled to the trapped sign of the multiplier for selectively transferring the true or the complement value of the multiplicand into the arithmetic section. Since the multiplicand must be read into the arithmetic section from the memory, the determination and selection of the true or complement value is accomplished on the fly and no additional time is added to the multiply operation for the selection of the form of the multiplicand. Another feature of this improved multiply circuitry is the multiplier digit selection circuitry which, in conjunction with the trapped sign of the multiplier, is capable of recognizing significance of either zero or one digits in the multiplier depending upon the value of the sign of the multiplier. This multiplier digit sensing circuitry eleminates the necessity of taking time during the setup of the multiply operands to complement the value of the multiplier when it is a negative value. By selecting the zero value digits as significant for negative multipliers, the multiplier is effectively complemented on a bit-by-bit basis, but there is in fact no complementation thereof nor any time wasted.

DRAWINGS

Figure 4:
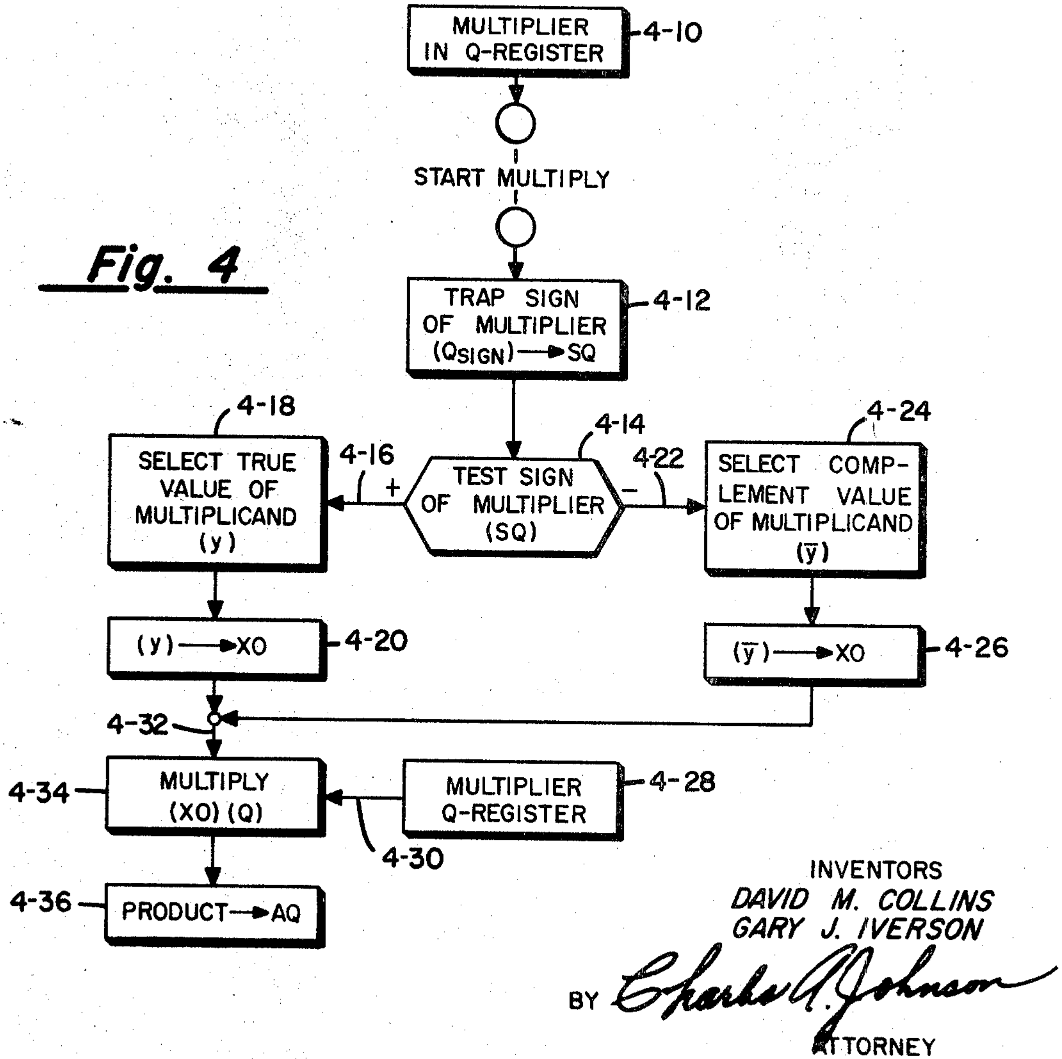
Figures 2, 2A:
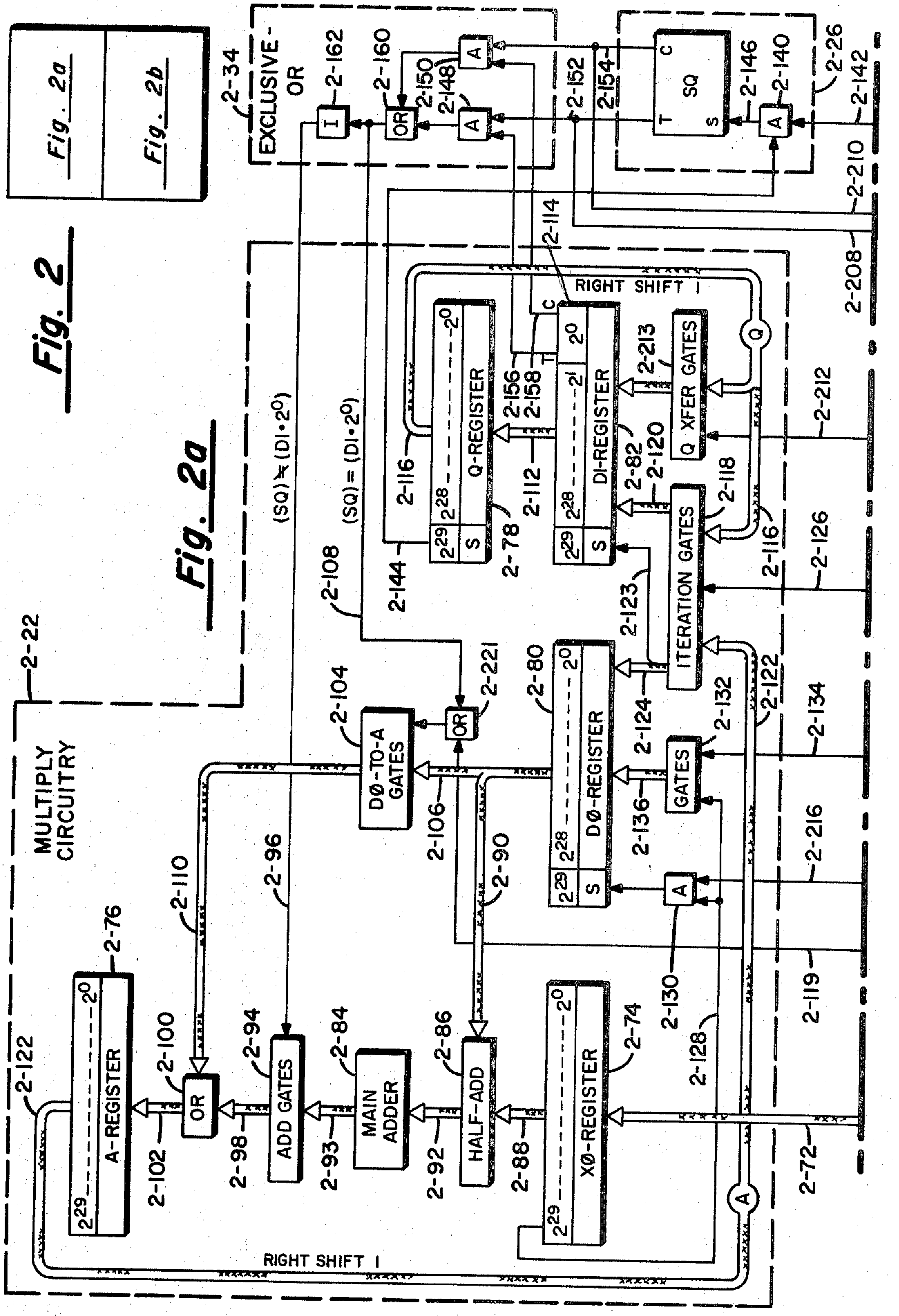
Figure 2B:
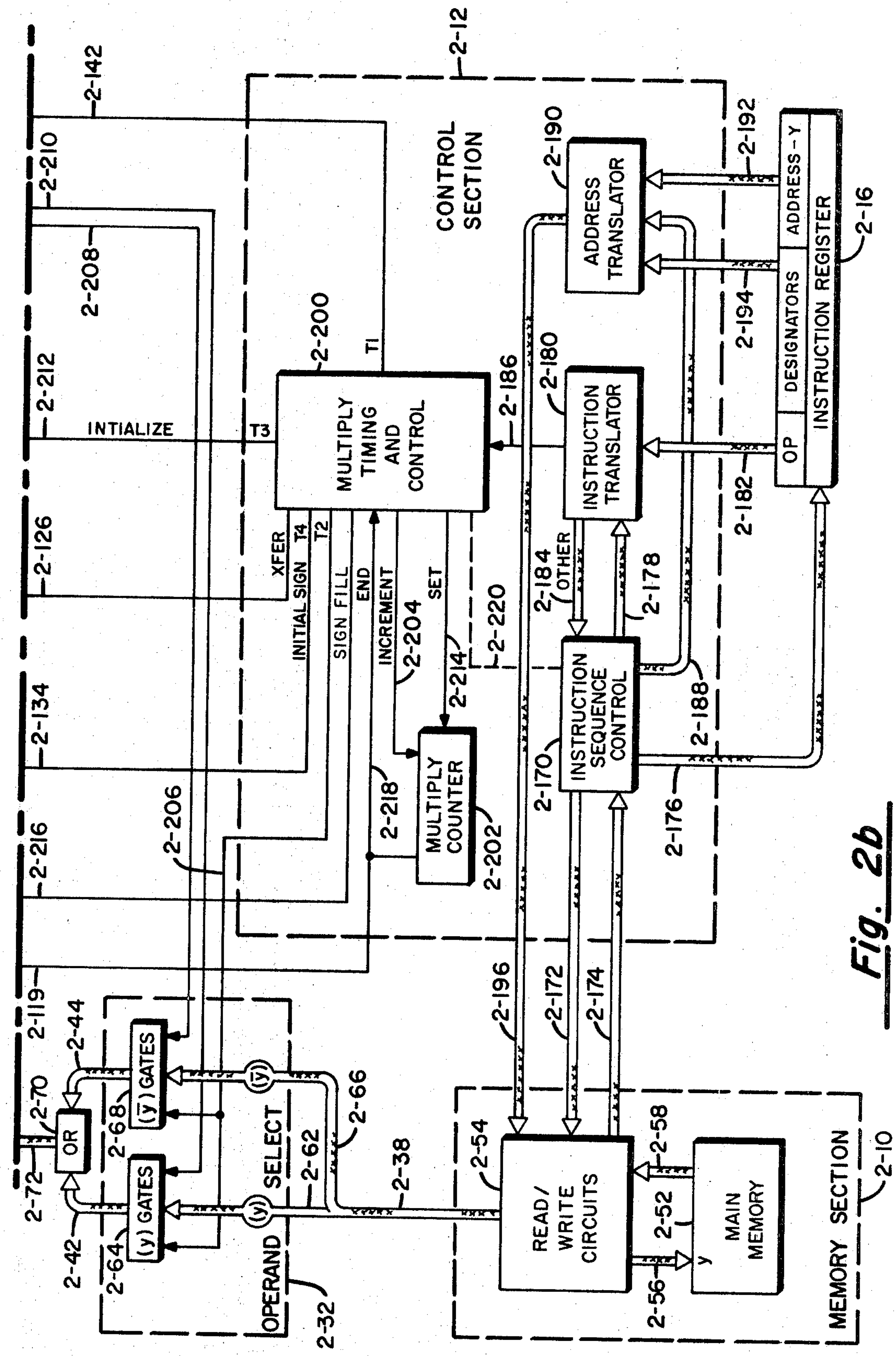
Figures 3, 5:
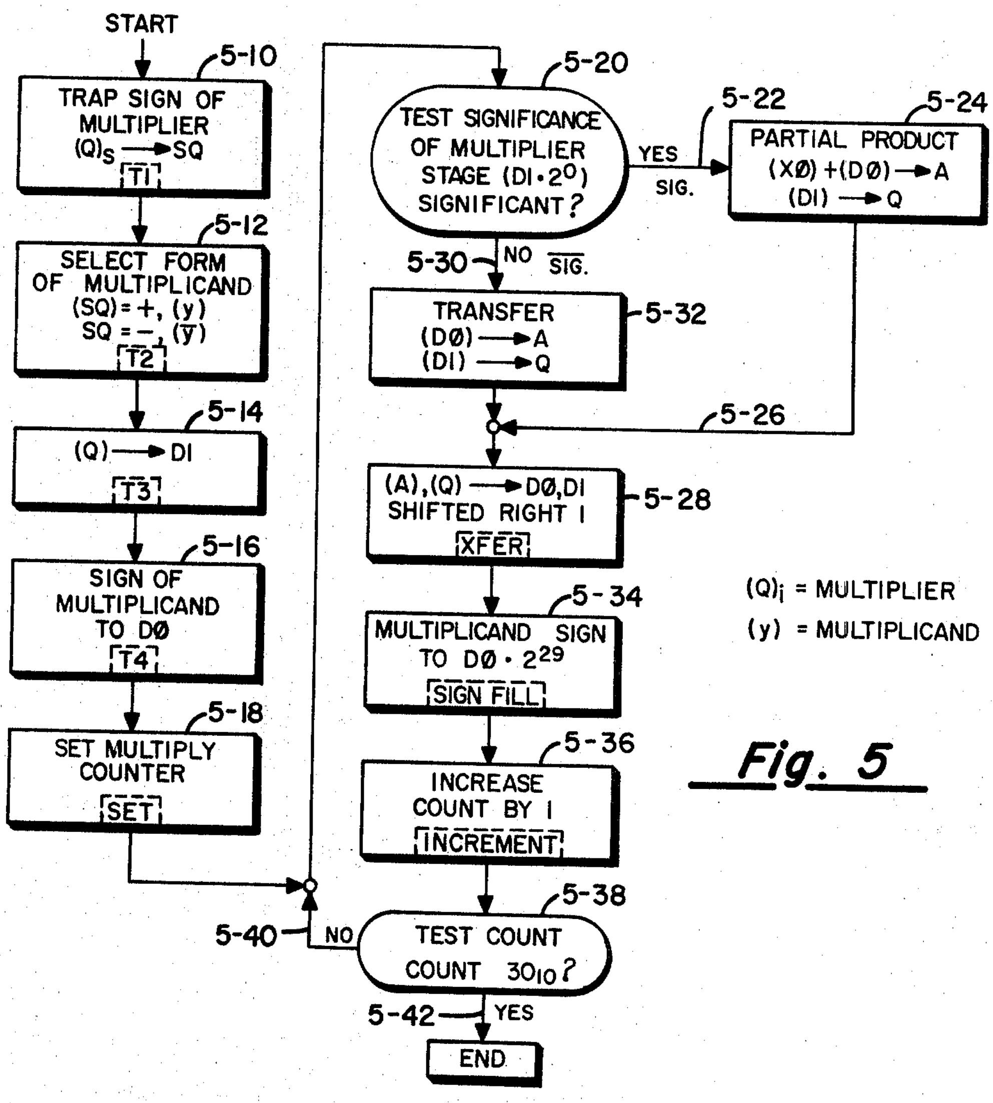

FIG. 1 is a simplified block diagram which illustrates the operational relationship of the primary elements of this invention; FIGS. 2*a* and 2*b* are block diagrams of one embodiment of the subject invention; FIG. 3 is a table which illustrates the relationship of the sign of the operands to the sign of the product and designates the form of the multiplicand which is to be entered into the multiply circuitry; FIG. 4 is a flow diagram which illustrates the operation of the invention; and FIG. 5 is a logical flow diagram of the multiply operation performed by the circuitry of FIG. 2.

CONVENTIONS

The following circuitry discussion of the improved multiply system will be in terms of block diagrams since the detail operation of the various elements are well known. Various registers will be referred to. These registers can be considered to be comprised of a plurality of bistable flip-flop circuits of a type readily available in the commercial marketplace. It will be understood that each flip-flop is capable of being set to one of two possible stable static conditions. It will further be understood that both the true and the complement value of the existing static state are available as output signals. For example, if a voltage level indicative of a true value is applied to the set input terminal, the voltage level indicative of the true value will be available at the T output terminal and a voltage indicative of the complement value will be available at the C output terminal. Alternatively, if the flip-flop is cleared for instance set to a voltage static state wherein a logical 0 is stored, a voltage indicative of a logical 0 will be available at the T output terminal and if complement voltage value indicative of a logical 1 will be available at the C output terminal. Each register for this embodiment is comprised of 30 stages designated as $2^0$ for the least significant to $2^{29}$ for the most significant digit positions. Stage $2^{29}$ is the sign indicating stage. A logical 1 signal stored therein represents a negative operand and a logical 0 signal stored therein represents a positive operand.

This embodiment makes use of logical connective circuits of types well known in the art. The logical AND circuit is denoted by a block with the letter A at the center thereof and represents a logical connective wherein both input terminals must receive like active signals in order for a similar active signal to be available at its output terminal. The logical OR circuit is designated with OR in the center of a block and operates to provide an active signal at its output terminal when any or all of its input terminals receive an active signal. An inverter circuit is illustrated as a block with an I at the center thereof and operates in a manner well known to invert the level of the signal applied to its input terminal.

The line connections between the various elements are of two basic types. A set of parallel lines terminated by an arrowhead indicates parallel conductive paths for carrying a plurality of data signals. A single line normally indicates a conductive path for carrying control signals. It should be recognized of course that there is no particular distinction between what is termed a "control signal" or a "data signal" other than it is convenient for purposes of discussion to distingush therebetween. Further, data signals can be utilized for performing control functions. The interconnection lines are terminated by an arrowhead. The arrowhead denotes the direction of signal flow and can be considered to be points of circuit interconnection. The detail operation of the various circuits will not be described nor will the precise circuit diagrams be illustrated in that it is felt that this would not tend to add to the understanding of the subject invention. Furthermore, the block diagrams illustrated are readily understood by those skilled in the art.

For purposes of this discussion, the terms "logical 1" and "logical 0" or simply "1" or "0" will be utilized to designate the appropriate signal level which is indicative of the binary 1 or 0 value. For example, when considering an AND circuit if it is designated that it is a two input AND, and 1's are considered to be active and available on both inputs, a 1 will be available at its output signal. This numerical designation of these signals is felt to be advantageous in that the precise signal levels will vary depending upon the circuitry chosen for the implementation.

In referring to an address in the addressable memory, the letter $y$ is utilized. To represent the operand stored at address $y$, the designation is $(y)$, with the parenthesis indicating the operand. The designation $(\bar{y})$ is utilized to represent the 1's complement of the operand stored at address $y$.

DESCRIPTION OF EMBODIMENT

FIG. 1 is a simplified block diagram which illustrates the operational relationship of the primary elements of this invention. The invention will be described in the environment of an operational data processing calculator. It is usual for such data processing calculators to have an established repertoire of instructions. The repertoire of instructions normally defines the operations which the calculator can perform, such as add, subtract, multiply, store, divide, and the like. In a stored program calculator, the list of instructions (program) which are to be performed are normally stored in a memory section from whence they are individually read out for execution. The order of reading out the instructions can be controlled by an instruction address counter for selecting sequential instructions, or can be of the type where each instruction designates the address of the next instruction to be executed. The mode of control is mentioned generally, and will not be described in any more detail, since it does not form a part of this invention. In the course of operation, the instructions are normally read into an instruction register. The instructions normally are comprised of an operation code, that is, the part which defines the function to be performed by the calculator. The instruction also includes an address portion for addressing the main memory or selecting operands either to be read out therefrom or stored therein. Additional designators are commonly employed to provide address modification by way of indexing (so called B-boxing), for providing for indirect addressing, and for determining whether or not a full length memory register or some portion thereof is to be utilized. These functions will not be described in detail since they do not form a part of the invention, but are indicated merely as setting the environment. When the instruction resides in the instruction register, the operation portion is normally translated by an operation code translator for selecting a particular set of control sequence circuits which will provide control signals for guiding the execution of the particular operation to be performed. Data processing machines can be of the single-address type, that is one wherein only one memory register of the main memory can be addressed in any given instruction; double-address machines wherein each instruction can designate two addresses in the main memory; or three address machines. The multiply apparatus of this invention will be described within the framework of a single-address machine. It is common in the execution of a program for a resultant operand to be stored both in the memory section of the computer and to be retained in the arithmetic section for manipulation by subsequent instructions. This is especially common in single-address machines wherein only one operand can be called for in a given instruction. For instance, in the miltiply operation where two operands must be specified it is necessary in a single-address machine to first have one of the operands residing in the arithmetic section. Subsequently when the multiply operation is called for, the address portion of the instruction designates the second operand which is to be utilized in the multiply operation.

Turning now to a consideration of FIG. 1, the Memory Section 10 is comprised of the storage registers in which the stored programs and recorded data reside. The Memory Section can be comprised of magnetic core storage registers, plated wire memory registers, bistable flip-flop registers, thin film registers, magnetic drum or disk records, or any of the other well-known types of memory apparatus. The Memory Section also includes the read/write amplifiers and address selection circuitry required for recording in a designated storage register and reading out of a designated storage register. A detailed operation of the Memory Section need not be considered further, it being understood that Memory Sections are available in the prior art. The Control Section 12 includes circuitry for timing the execution of each instruction and for accessing the memory section. Commonly an oscillator is used as a primary source of regularly appearing signals. These signals are used to drive timing chains, that is groups of circuits which provide control pulses at predetermined times. The Control Section operates to sequentially read the instructions over cable 13 from the Memory Section, and along cable 14 into the Instruction Register 16. The Instruction Register is comprised of the operation portion **16*a* and the address portion 16*b*. The operation portion, designated as "Multiply" for illustration, is directed over cable 18 into the Control Section. The bit configuration which represents the multiply operation is decoded in the Control Section 12 and operates to issue the control signals on control lines 20. The Multiply Circuitry 22 includes registers for storing the multiplier and multiplicand and the main adder. These elements will be described in more detail below. For the embodiment of the invention, it is established that the multiplier operand resides in the Multiply Circuitry 22 when the multiply operation is initiated. The multiplier is a signed binary number, and the negative value of a positive number is determined by performing the 1's complement of the positive number. When a multiply operation is indicated by the operand portion of the instruction in the Instruction Register 16, the Control Section 12 operates to issue an initial timing pulse T1 on line 24 which is directed to the Sign Trap Circuitry 26. The Sign Trap Circuitry senses the sign of the multiplier via wire 28 and holds the sign value throughout the multiply operation. The sign of the multiplier is provided on conductor 30 as input signals to the operand select circuitry 32 and to the Encode Multiplier circuitry 34. Each of these elements will be described in more detail below. While the Control Section 12 is translating the multiply operation, the $y$-address of the multiplicand is transferred via cable 36 through Control Section 12 and over cable 37 to the Memory Section 10. The multiplicand is read out from the Memory Section on cable 38 into the Operand Select circuitry. Having trapped the sign of the multiplier, the form of the multiplicand can be established. During timing period T2, which is subsequent to the trapping of the sign, Control Section 12 issues a pulse on conductor 40 which enables the selection of the form of the multiplicand. If the sign of the multiplier operand is positive, as indicated by the signal on conductor 30, the Operand Select circuitry 32 operates to provide the true value of the multiplicand on cable 42 to the Multiply Circuitry 22. Alternatively, if the sign of the multiplier is negative, as determined by the signal on line 30, the complement value ($\overline{y}$) of the multiplicand is provided via cable 44 as an input to the Multiply Circuitry 22. During the multiply iterations, the Encode Multiplier Circitry 34 operates to determine whether or not 1 digits or 0 digits of the multiplier are to be considered as significant. During each iteration cycle, the digit of the multiplier is provided on conductor 46 as one input to Multiplier Encoding circuitry 34. The Encoding circuitry also receives the value of the trapped sign via conductor 30. The algorithm for the encoding is such that when the sign of the multiplier is negative, the 0 digits of the multiplier are considered to be significant and cause the formation of a partial product, and the 1 digits merely cause a shifting operation; and, when the sign of the multiplier is positive, the 1 digits of the multiplier are considered to be significant in forming the partial product, and the 0 digits will merely cause the shift operation. These signals are directed to the multiplier via conductor 48. The Control Section 12 operates to emit pulses along control line 50 to the Multiply Circuitry 22 for controlling each iterative cycle. Upon the completion of the predetermined number of iterations, the Multiply Circuitry 22 has generated the appropriate end product which is available for storage or for further manipulation. At that time the Control Section 12** goes on to initiate execution of the next instruction. The actual operation of the muliply operation will be described in more detail below.

FIG. 2 is a more detailed block diagram of one embodiment of the subject invention. Elements which have been given a reference numeral in FIG. 1 are referred to hereinafter as the figure number—the reference numeral. The Memory Section is shown enclosed within dashed block 2–10 and comprises a Main Memory storage element 2–52, and the Read/Write Circuits 2–54. Cable 2–56 is utilized to write data into the Main Memory 2–52 and cable 2–58 is utilized to read operands out.

The Operand Select circuitry is shown enclosed in dashed block 2–32. The true value of each digit in the referenced memory register $y$ is directed into cable 2–62, and thence to the ($y$) Gates 2–64. For purposes of the remainder of this discussion, the term "gates" will refer to a plurality of AND circuits, or the like, with one such AND circuit for each digit position. The complementary output signals for each digit of the referenced memory register $y$ are coupled in parallel into cable 2–66 and are directed to respectfully associated ones of the ($\overline{y}$) Gates 2–68. The enabling of the ($y$) Gates and the ($\overline{y}$) Gates is mutually exclusive. That is, the output signals will be available from only one of such set of gates. The output signals from the ($y$) Gates are directed on cable 2–42 into OR circuits 2–70. The output signals from the ($\overline{y}$) Gates are directed in parallel through cable 2–44 into OR circuits 2–70. The output signals from OR circuits 2–70 are directed into cable 2–72, and are utilized for setting respectively oriented stages of the Xϕ Register 2–74. The ($y$) Gate or ($\overline{y}$) Gate selection is made as the operand is read from Main Memory 2–52, thereby effecting the selection of the form of the operand on the fly.

The Xϕ Register is part of the Multiply Circuitry which is shown enclosed in dashed block 2–22. Other elements in the Multiply Circuitry are the A Register 2–76, the Q Register 2–78, the Dϕ Register 2–80, and the D1 Register 2–82. Each of these registers is comprised of 30 bistable storage elements. A Main Adder 2–84 is comprised of a parallel input, subtractive 1's complement adder. The Main Adder may be any of a plurality of well-known adders and for example may be similar to that illustrated in the Cochran patent listed above. The Half-Add 2–86 circuitry is adapted for receiving the operand stored in the Xϕ Register by way of cable 2–88 and the bit configuration stored in the Dϕ Register 2–80 on cable 2–90. Like-ordered bit positions from the two registers are gated into associated stages of the Half-Adder 2–86. The result of the Half-Add is directed on cable 2–92 to the Main Adder 2–84 in a manner well-known. Since this illustrative embodiment uses a 30-bit register, it can be seen that 30 two-input gate circuits are utilized to comprise the Add Gates 2–94. The Add-Gates receive the digits of the result of the Add from the Main Adder 2–84 on cable 2–93. The second input for each bit position is enabled in common by a signal received on enable line 2–96. A generation of this add enable signal will be described in more detail below. The sum $(X\phi)+(D\phi)$ is generated for each cycle, but only when the add enable signal is provided to the Add Gates is the resultant sum $(X\phi)+(D\phi)$ provided on cable 2–98 as one set of input signals to OR circuits 2–100. This resultant sum forms a part of the partial product for each iteration. OR circuits 2–100 operates to provide the sum bit-configuration on cable 2–102 for setting the respectively associated stages of the A Register 2–76. The Dϕ Register 2–80 also directs signals from its true output terminals to the Dϕ-to-A Gates 2–104 on cable 2–106. The Dϕ-to-A Gate are comprised of 30 two-input gate circuits, where one of the input signals to each of the gate circuits is provided from an associated stage of the Dϕ Register. The other common input to each of the Dϕ-to-A Gate is provided on control line 2–108. When the enable signal is present on line 2–108, the 30-bit signal configuration stored in the Dϕ Register is transferred on to cable 2–110, through OR circuits 2–100, and into the A Register 2–76. Respectively ordered stages of Dϕ are transferred into like ordered stages of the A Register. Stages $2^0$ through $2^{29}$ of the D1 Register 2–82 are transmitted on cable 2–112 to like ordered stages of the Q Register 2–78. The $2^0$ stage of D1 Register 2–82 is referred to as $D1\cdot 2^0$ and is labeled 2–114. This stage is utilized in the multiply iteration for holding the multiplier digit being considered during each iteration cycle. The Q Register 2–78 provides signals on cable 2–116 which are indicative of the value stored in the Q Register. These signals are directed to the Iteration Gates 2–118 which operate to shift the value stored in the Q Register one position to the right, and to transmit the shifted value on cable 2–120 into bit positions $2^0$ through $2^{28}$ of the D1 Register, with the lowest ordered digit from Q being discarded for each cycle. In a similar manner, the A Register 2–76 transmits the bit configurations stored therein on cable 2–122 into the Iteration Gates. This value is similarly shifted right one position so that the value stored in bit position $2^0$ of the A Register is directed into the sign position ($2^{29}$) of the D1 Register 2–82 on wire 2–123 and the remainder of the bits of the A Register, $2^1$ through $2^{29}$, are transferred on cable 2–124 into bit positions $2^0$ through $2^{28}$ respectively of the Dφ Register 2–80. During the course of the multiply operation the Iteration Gates 2–118 are enabled by a signal received on common conductor 2–126 and will be described in more detail below. In providing a sign fill capability, the sign of the multiplicand, which is stored in the stage $2^{29}$ of Xφ Register 2–74, is directed on conductor 2–128 as an input to AND circuit 2–130, and as a common input to Gates 2–132 for purposes of initialization. Gates 2–132, when enabled by a signal on control path 2–134, provide the value of the sign of the multiplicand stored in Xφ on cable 2–136 to all stages of the Dφ Register 2–180.

The Sign Trap Circuitry is shown enclosed in dashed block 2–26. It comprises a flip-flop designated as SQ. An AND circuit 2–140 receives a control input on conductor 2–142, and the true output signal from the sign stage $2^{29}$ of the Q Register 2–78 on conductor 2–144. When AND circuit 2–140 is activated by the control signal, the sign of the operand stored in the Q Register is gated onto conductor 2–146 into the Set input terminal of SQ, thereby trapping the sign of the multiplier. The SQ circuit is utilized for determining significance of each multiplier digit, and for selecting the form of the multiplicand.

The Encode Multiplier Circuitry is shown enclosed in dashed block 2–34. It is comprised of an Exclusive-OR circuit. The Exclusive-OR circuit has AND circuits 2–148 and 2–150 for receiving input signals. The T output terminal of SQ is coupled to one input terminal of AND 2–148 by conductor 2–152, and the C output terminal is coupled via conductor 2–154 to one input terminal of AND 2–150. Stage $D1 \cdot 2^0$ of the D1 Register provides the other two input signals to the Exclusive-OR circuit. The T output terminal is coupled to line 2–156, which in turn is coupled to the other input terminal of AND 2–148. The C output terminal is coupled to the second input terminal of AND 2–150 by wire 2–158. AND circuits 2–148 and 2–150 have their output terminals coupled to the two input terminals of OR circuit 2–160. The output terminal of OR 2–160 is utilized to drive the Dφ-to-A enable line 2–108, and is also provided as the driving point to Inverter circuit 2–162. The signal provided at the output terminal of Inverter 2–162 is generated on line 2–96, and is utilized to control the operation of the Add Gates 2–94. The function of the Encode Multiply Circuitry 2–34 is to determine whether a partial product is to be generated by providing an enable signal on line 2–96, or whether a shift operation only is to be executed by providing the enable on line 2–108. The Add Gates 2–94 are enabled when the sign of the multiplier differs from the digit being considered, as indicated by $$(SQ) \neq (D1 \cdot 2^0)$$

and the Dφ-to-A Gates 2–104 are enabled when the condition $(SQ) = (D1 \cdot 2^0)$ is met. This determination of the significance of the multiplier digit being considered during the iteration cycle will be described in more detail below under the heading Operation.

The Control Section is shown enclosed in dashed block 2–12. The Instruction Register 2–16 is coupled through the Control Section 2–12 to the Memory Section 2–10 and to the Multiply Circuitry 2–22, and to the Operand Select 2–32. The control of the sequencing of the individual instructions which comprise an operating program is controlled by the Instruction Sequence Control 2–170. The Instruction Sequence Control includes such items as the program address counter for determining the memory address of each instruction as it is required, a source of timing pulses for driving the timing chains which performs execution of each individual instruction, and the like. This portion of the control circuitry is not shown in detail since the operations are well-known and it does not form a part of this invention. The Instruction Sequence Control 2–170 sends address requests on cable 2–172 to the Read/Write Circuitry 2–54 which in turn access Main Memory 2–52 via cable 2–56. The address so referenced in Main Memory is read out on cable 2–58 by the read circuits and are directed via cable 2–174 through the Instruction Sequence Control 2–170 on cable 2–176 into the Instruction Register 2–16. Having so read the instruction into the Instruction Register, the Instruction Sequence Control operates to send control signals along cable 2–178 to the Instruction Translator 2–180. The operation portion of the Instruction Register is directed on cable 2–182 into the Instruction Translator, which in turn operates to provide an output signal indicative of the type of operation that is to be performed. For those instances other than the multiply, a signal would be provided on cable 2–184 to the Instruction Sequence Control for performing the designated operation. When a multiply operation code is held in Instruction Register 2–16, the Instruction Translator 2–180 provides a signal on line 2–186 which is indicative that the multiply is to be performed. While the instruction operation is being translated, the Instruction Sequence Control 2–170 is also providing control signals along cable 2–188 to the Address Translator 2–190. The Address Translator also receives input signals from the Address-*y* portion of the Instruction Register 2–16 via cable 2–192. The Designator portion of the Instruction Register is also coupled to the Address Translator 2–190 via cable 2–194. The operation of the Designators will not be described in detail since it does not form a part of this invention. It is the function of the Address Translator 2–190 to provide on cable 2–196 an absolute Main Memory address. This bit configuration which indicates an absolute memory address is directed to the Read/Write Circuits 2–54, and the designated memory address *y* is referenced in the Main Memory 2–52. The content of this memory address is read from the Main Memory onto cable 2–38. For the multiply operation, the operand so read is the stored multiplicand.

The Multiply Timing and Control 2–200 is shown removed from the Instruction Sequence and Control 2–170 for ease of explanation. It is pointed out that normally the multiply would be included in the type of sequence control described above. It is the function of Multiply Timing and Control 2–200 to control the initiation and execution of the multiply operation. The control of the multiply operation includes the use of a Multiply Counter 2–202 for controlling the number of iterations which are necessary to perform the multiply. The multiply counter is of a type well-known in the art, and has an operation such that for every pulse received on the Increment line 2–204 from the Multiply Timing and Control, the value stored in the Multiply Counter will be increased by a binary count of 1.

The sequence of events that must be accomplished to initialize and perform the total multiply will now be described. Upon the receipt of the multiply signal on line 2–186, the Multiply Timing and Control 2–200 issues a control pulse T1 on line 2–142 to AND 2–140, thereby enabling the trapping of the sign of the multiplier which is stored in the Q Register 2–78. Having trapped the sign of the multiplier, it is necessary to gate the multiplicand into the Multiply Circuitry 2–22. Sufficient time has elapsed so that SQ has stabilized. In order to select the form of the multiplicand, it is necessary to consider both the sign of the multiplier, and to have the appropriate control pulse available. The control pulse provided by Multiply Timing and Control 2–200 occurs subsequent to the trapping of the multiplier sign, and will be accomplished by a pulse T2 directed on control line 2–206. This control line is coupled to the ($y$) Gates 2–64 and the ($\overline{y}$) Gates 2–68. In other words, the Multiply Timing and Control activates both sets of gates leaving the selection of the appropriate set of gates to the sign of the multiplier. This selection is accomplished by having the T output terminal coupled by way of control line 2–208 to the ($\overline{y}$) Gates 2–68; and having the C output terminal coupled through control line 2–210 to the ($y$) Gates 2–64. It can be seen that when the sign of the multiplier is positive, SQ will store a 0, thereby providing a 0 at the T output terminal. This 0 will disable ($\overline{y}$) Gates 2–68. Simultaneously, the complement of the 0 will result in a 1 being present at the C output terminal. Since this is coupled to wire 2–210 into the ($y$) Gates 2–64, the true value of the operand will be gated through OR circuit 2–70 into the X$\phi$ Register 2–74. When the sign of the multiplier is negative, the reverse condition will exist, since a 1 will be stored in SQ. Following the example through, it will be seen that the ($\overline{y}$) Gates 2–68 will be enabled by the signal received on wire 2–208, and the complement of the multiplicand will be gated through the OR circuits 2–70 into the X$\phi$ Register 2–74. Having thus selected the form of the multiplicand, the Multiply Timing and Control 2–200 must initialize the D$\phi$ Register 2–80 and the D1 Register 2–82. This is accomplished by providing a signal T3 on line 2–212 to the Q Transfer Gates 2–213. The signal applied to the Q Transfer Gates causes the value of the multiplier stored in the Q Register 2–78 to be transmitted on cable 2–116 directly into the D1 Register 2–82. It remains then to initialize D$\phi$. This is accomplished during a subsequent time period when the Multiply Timing and Control 2–200 provides a signal T4 on line 2–134 to Gates 2–132. It will be recalled from above that the sign of the multiplicand, as stored in the X$\phi$ Register 2–74, is provided on conductor 2–128 to Gates 2–132. By the initialization of pulse T4, the value of the sign of (X$\phi$) is stored in the D$\phi$ Register 2–80. This then completes the initialization process and the multiply operation can commence. Having initialized the registers, Multiply Timing and Control 2–200, operates to set the Multiply Counter 2–202 to an initial count condition of 0. Having completed this setup, a transfer (Xfer) pulse is emitted from Multiply Timing and Control 2–200 on line 2–126 for enabling the Iteration Gates 2–118. Of course it is apparent at this time that preceding the transfer pulse, the contents of the D1 Register 2–82 had been stored in the Q Register 2–78, since they are directly coupled; and that the value of D$\phi$ Register 2–80 had been transferred either through the Add Gates 2–94 for forming a part of the partial product or through the D$\phi$-to-A Gates 2–104, and has ultimately reached the A Register 2–76. Therefore, upon the occurrence of the transfer pulse on line 2–126, the values then stored in the A Register 2–76 and the Q Register 2–78 are right shifted, as described above, and are held in the D$\phi$ Register 2–80 and the D1 Register 2–82, respectively. Following the transfer, it is necessary to provide a sign fill signal on line 2–216 to AND circuit 2–130. It will be recalled again from above, that the sign of the multiplicand is directed on line 2–128 to AND 2–130. Upon the occurrence of the sign fill signal, the sign stage of the D$\phi$ Register 2–80 will be filled with the sign of the multiplicand ($X\phi \cdot 2^{29}$). Also at this time, it is necessary to provide an Increment signal on line 2–204 to the Multiply Counter 2–202 for indicating that one iteration cycle has been completed. The foregoing sequence will be repeated until such time as the Multiply Counter 2–202 has reached a count of $30_{10}$ condition. At this time, 30 iterations have been completed and an End signal will be directed from the Multiply Counter 2–202 on line 2–218 to the Multiply Timing and Control. This signals that the multiply operation has been completed, and that the product resides in the D$\phi$ Register 2–80 and the D1 Register 2–82. This End signal is directed on line 2–119 to OR circuit 2–221, thereby enabling the D$\phi$-to-A Gates 2–104. This results in the product ultimately residing in the A Register and the Q Register. Since Multiply Timing and Control 2–200 is part of the same Instruction Sequence Control, as indicated by the dashed interconnecting line 2–220, the Control Section 2–12 is advised that the next instruction can be executed.

FIG. 3 illustrates the sign relationship of the operands and the required sign of the product. It further illustrates the form of the multiplicand, that is the operand form that is gated to X$\phi$, for the possible sign conditions. The table illustrates that when the sign of the multiplier (Q) is plus, that the true value of the multiplicand ($y$) is selected irrespective of the sign of the multiplicand. Alternatively, when the sign of the multiplier (Q) is minus, the form of the multiplicand selected is ($\overline{y}$) irrespective of the sign of the multiplicand.

FIG. 4 is a flow diagram which illustrates the algorithm for the selection of the appropriate form of the multiplicand as illustrated in FIG. 3. As stated above, the multiplier is assumed initially to reside in the Q Register, as illustrated by block 4–10. At the start of the multiply operation, the first step that is provided is to trap the sign of the mutliplier by directing the contents of the Q Register sign position to the SQ flip-flop, as designated by block 4–12. Having thus trapped the sign of the multiplier, it is necessary to test the sign of the multiplier by sensing the value stored in SQ, as indicated by test block 4–14. When a + signal results, the + path 4–16 is selected, thereby causing the true value of the multiplicand ($y$) to be selected, as indicated by block 4–18. Having thus made the decision to select the true value, the true value of the designated $y$ address is transmitted to the X$\phi$ Register, as indicated by block 4–20. The X$\phi$ Register is directed to the multiply circuitry. In the event that the value of SQ indicates a negative, − path 4–22 is taken, whereby the complement value of the multiplicand ($\overline{y}$) is selected, as indicated by block 4–24. This results in the complement value being transmitted to X$\phi$, as indicated by block 4–26. As stated above, the multiplier resides in the Q Register, as shown by block 4–28, and is also directed to the multiply. It can be seen then that the multiplier is directed on path 4–30 to the multiply, and that the value selected by steps 4–20 or 4–26 results in a value in X$\phi$, which is directed to the multiply operation as indicated by line 4–32. The multiply, which may be any of many well-known multiply algorithms, forms the product of (X$\phi$) (Q), as indicated by block 4–34, with the ultimate product being transmitted to AQ as indicated by block 4–36.

OPERATION

The basic multiply algorithm, as mentioned above, can be any of a well-known type and for this embodiment comprises a system for serially generating, summing, and shifting partial products, where the partial products are successive summations of the multiplicand value. The invention provides a unique multiply system in that products of correct magnitude and sign are always generated directly, and the algorithm does not include generation of a correction factor which is normally required when the multiplier is of a negative value. Neither is it necessary to ever actually complement the multiplier, although it sometimes is encoded in a manner such that it is effectively complemented. In this system, the multiplier is always encoded as though it were a positive number, thus, when the multiplier is in fact a negative value, the encoding circuitry treats 0 digits as the significant digits for the generation of the partial products. The effect is the same as complementing the negative number and treating one digits as significant as is done for positive numbers, but has the advantage of saving the circuitry and time normally required for this type of handling of the multiplier. As has been explained, the operand which is read from the memory and which is to be the multiplicand is presented to the arithmetic section in both the normal and the complemented form. Since the multiplier encoding system causes the multiplier to appear as though it were always a positive number, the multiplicand complement is selected when the multiplier is actually negative. Refer again to FIG. 3 for the selection of the form of the multiplicand depending upon the sign of the multiplier. In FIGS. 1 and 2 the logic of one embodiment of the subject invention has been described.

FIG. 5 illustrates a logical flow diagram which defines the complete multiply algorithm of the subject invention. Block 5–10 represents the trapping of the multiplier sign by taking stage $2^{29}$ of the Q Register to SQ during control timing period T1. Block 5–12 illustrates the selection of the form of the multiplicand, as described above, in conjunction with FIG. 4, this selection being done during timing period T2. Block 5–14 illustrates the initialization of the multiplier into the D1 Register during timing period T3. Block 5–16 represents the initialization of the sign of the multiplicand into the total Dϕ Register during the T4 timing period. Finally for the initialization, block 5–18 illustrates the setting of the multiply counter to its proper count condition. Decision element 5–20 represents the testing of the significance of the stage of the multiplier stored in $(D1\cdot 2^0)$. This encoding of the multiplier digits on a bit-by-bit basis, uses the following format:

(A) Significant Digit of Multiplier—

(1) Adder to A; $[(X\phi)+(D\phi)]$ with (D1) to Q;
(2) (A), (Q) to Dϕ, D1 shifted end-off right one position; and
(3) Insert sign of multiplicand in $D\phi 2^{29}$.

(B) $\overline{\text{Significant}}$ Digit of Multiplier—

(1) (Dϕ) (D1) to A and Q;
(2) (A), (Q) to Dϕ, D1 shifted end-off right one position; and
(3) Insert sign of multiplicand in $D\phi 2^{29}$.

The determination of significance (SIG.) or $\overline{\text{significance}}$ $\overline{\text{(SIG.)}}$ is accomplished by the Exlusive-OR circuitry described in FIG. 2. It will be recalled that significance of the multiplier digit exists when $(SQ)\neq(D1\cdot 2^0)$. The determination of $\overline{\text{significance}}$ exists when $$(SQ)=(D1\cdot 2^0)$$

If the multiplier digit is found to be significant, the "yes" line 5–22 is taken and a partial product is formed by adding the contents of the Xϕ Register to the contents of the Dϕ Register and transmitting it to the A Register, while transmiting the contents of the D1 Register to Q, as indicated by block 5–24. Having thus formed the partial product, path 5–26 is taken, at which time the (A), (Q) is transferred with a shift right of one to Dϕ and D1 respectively, as indicated by block 5–28. In the event that the multiplier digit is not significant, path 5–30 is taken and the contents of the Dϕ Register are transfered to the A Register and the contents of the D1 Register are transferred to Q as indicated by block 5–32. Having thus transferred the values to A and Q, the shift operation indicated in block 5–28 is achieved. With Dϕ and D1 loaded, it is necessary to insert the sign of the multiplicand in $D\phi\cdot 2^{29}$ as indicated in block 5–34. The count of the multiply counter can then be increased by 1, as indicated in block 5–36, and the value of the count can be tested for equality to $30_{10}$, as indicated by decision element 5–38. If the count is not 30, the "no" path 5–40 is taken and the next digit of the multiplier is tested for significance. In the event that the count is 0, the "yes" path 5–42 is taken and the multiply operation is completed by an unconditional transfer of (Dϕ) to A and (D1) to Q.

It is felt that some numerical examples of the multiply operation will aid in understanding the benefits which accrue from the subject invention. It will be recalled that for this embodiment, 30-bit operands are utilized, but it is felt that for purposes of example and for ease of understanding of the examples, that 6-bit operands will suffice. This follows since the iteration operations become repetitive and do not aid appreciably in an understanding of the total operation. In Example I listed below, a positive multiplier of $21_{10}$ is stored at address *y*. The product of $21_{10}\times 21_{10}$ is $441_{10}$ which is also equal to $000110111001_2$. It will be noted in Example I that the sign of the multiplier is positive; hence, the digits of the multiplier which are equal to "1" will be considered to be significant. Referring to FIG. 3 it will be seen that with a positive sign of the multiplier, the value (*y*) will be selected for transmission to the Xϕ Register. The operation is such that when a "1" multiplier digit exists, the multiplicand (Xϕ) is the partial product, and is added to the sum representing the partial products previously generated, and this new value transmitted to AQ. The new sum is shifted right one position. For those instances when a "0" multiplier digit exists, the existing sum represents the partial products previously generated and it is necessary only to generate a right shift of one. In both instances the sign of the multiplicand is filled into $D\phi\cdot 2^{29}$. The step-by-step operation illustrated in Example I for iterations 1 through 6 are felt to be self-explanatory. In the Test Significance column at the right of Example I, the ⊕ indicates an Exclusive-OR and will generate a significant (SIG.) signal when the value stored in SQ differs from that of the multiplier digit which is shifted to the right of the vertical line. Alternatively, a $\overline{\text{significant}}$ $(\overline{\text{SIG.}})$ will be generated when the multiplier digit is the same as the sign stored in SQ.

EXAMPLE I $(y)=010101_2=+25_8=+21_{10}(Q)_i=010101_2=+25_8=21_{10}$
$(y)\ (Q)=000110111001_2=671_8=441_{10}$

OPERATION

TRAP SIGN OF MULTIPLIER—(SQ)=0

Initialize
SELECT $(y)=(X\phi)=010101_2$
Initial Sign to$(D\phi)=000000$ $(D1)=010101$ — $(Q)_i$ — TEST SIGNIFICANCE: $[1\oplus 0]=\text{Sig.}$ $(X\phi)=\underline{010101}$
$(X\phi)+(D\phi)\rightarrow(A)_1=010101$ $(Q)_1=010101$
Right $1(D\phi)=001010(D1)=101010$ — $[0\oplus 0]=\overline{\text{Sig.}}$
$(D\phi)(D1)\rightarrow AQ(A)_2=001010$ $(Q)_2=101010$
Right $1(D\phi)=000101(D1)=010101$ — $[1\oplus 0]=\text{Sig.}$
$(X\phi)=\underline{010101}$
$(D\phi)+(X\phi)=(A)_3=011010$ $(Q)_3=010101$
Right $1(D\phi)=001101(D1)=001010$ — $[0\oplus 0]=\overline{\text{Sig.}}$
$(D\phi)(D1)\rightarrow AQ(A)_4=001101$ $(Q)_4=001010$
Right $1(D\phi)=000110(D1)=100101$ — $[1\oplus 0]=\text{Sig.}$
$(X\phi)=\underline{010101}$
$(D\phi)+(X\phi)$ $(A)_5=011011$ $(Q)_5=100101$
Right $1(D\phi)=001101(D1)=110010$ — $[0\oplus 0]=\overline{\text{Sig.}}$
$(D\phi)(D1)\rightarrow AQ(A)_6=001101$ $(Q)_5=110010$
Right $1(D\phi)=000110(D1)=111001$
$(D\phi)(D1)\rightarrow AQ(A)_f=000110$ $(Q)_f=111001$ — Unconditional In Example II a multiplier of $+21_{10}$ is to be multiplied times the multiplicand $-21_{10}$. Since the multiplier is positive and the multiplicand is negative, the product will have a negative sign. As in Example I, the sign of the multiplier is positive; hence the value $(y)$ will be transmitted to $X\phi$. Again as in Example I, the positive sign of the multiplier results in "1" digits of the multiplier being significant. Accordingly, when a "1" multiplier digit exists in the position being tested, the multiplicand $(X\phi)$ is the partial product and is added to the sum representing the partial products previously generated. This new sum is then shifted right one position. A "0" digit in the multiplier results in the partial products previously generated being shifted right one position. In this example, it is expressly pointed out that the sign fill for each iteration cycle results in a "1" being inserted in the most significant digit of $D\phi$.

EXAMPLE II $(y)=101010_2=-25_8=-21_{10}(Q)_i=010101_2=+25_8=+21_{10}$
$(y)(Q)=111001000110_2=-671_8=-441_{10}$

OPERATION

TRAP SIGN OF MULTIPLIER—(SQ)=0

| | | (Q)i | TEST SIGNIFICANCE |
|---|---|---|---|
| Initialize | SELECT(y)=(Xφ)=101010 | | |
| | Initial Sign to (Dφ)=111111(D1) | =010101 | [1⊕0]=Sig. |
| | (Xφ)=101010 | | |
| | 101001 (carry)+1 | | |
| | (Xφ)+(Dφ)=(A)1=101010(Q)1 | =010101 | |
| | Right 1(Dφ)=110101(D1) | =001010 | [0⊕0]=$\overline{\text{Sig.}}$ |
| | (Dφ)(D1)→AQ(A)2=110101(Q)2 | =001010 | |
| | Right 1(Dφ)=111010(D1) | =100101 | [1⊕0]=Sig. |
| | (Xφ)=101010 | | |
| | 100100 (carry)+1 | | |
| | (Xφ)+(Dφ)=(A)3=100101(Q)3 | =100101 | |
| | Right 1(Dφ)=110010(D1) | =110010 | [0⊕0]=$\overline{\text{Sig.}}$ |
| | (Dφ)(D1)→AQ(A)4=110010(Q)4 | =110010 | |
| | Right 1(Dφ)=111001(D1) | =011001 | [1⊕0]=Sig. |
| | (Xφ)=101010 | | |
| | 100011 (carry)+1 | | |
| | (Xφ)+(Dφ)=(A)5=100100(Q)5 | =011001 | |
| | Right 1(Dφ)=110010(D1) | =001100 | [0⊕0]=$\overline{\text{Sig.}}$ |
| | (Dφ)(D1)→AQ(A)6=110010(Q)5 | =001100 | |
| | Right 1(Dφ)=111001(D1) | =000110 | |
| | (Dφ)(D1)→AQ(A)f=111001(Q)f | =000110 | Unconditional |

In Example III, a multiplier of $-21_{10}$ is to be multiplied times a multiplicand of $+21_{10}$. In this operation, it can be seen that the sign of the multiplier is negative; hence, the value $(\bar{y})$ is selected for transmission to the $X\phi$ Register. Since the sign is negative, the "0" bits of the multiplier will be encoded as significant. Accordingly, when a "0" multiplier digit exists, the multiplicand $(X\phi)$ is the partial product and is added to the sum representing the partial products previously generated. This new sum then is shifted right one position. Again the sign fill should be noted in that a "1" is inserted in the most significant bit position of $D\phi$ from the sign position of $X\phi$.

When a "1" multiplier digit exists, the sum representing the partial product previously generated is shifted right one position and a "1" is inserted in the most significant bit position of $D\phi$. In this example it will be noted that the negative multiplier and positive multiplicand results in a negative product.

EXAMPLE III $(y)=010101_2=+25_8=+21_{10}$
$(Q)_i=101010_2=-25_8=-21_{10}$
$(y)(Q)=111001000110_2=-671_8=-441_{10}$

OPERATION

TRAP SIGN OF MULTIPLIER—(SQ)=1

| | | (Q)i | TEST SIGNIFICANCE |
|---|---|---|---|
| Initialize | SELECT $(\bar{y})$=(Xφ)=101010 | | |
| | Initial Sign to (Dφ)=111111(D1) | =101010 | [0⊕1]=Sig. |
| | (Xφ)=101010 | | |
| | 101001 (carry)+1 | | |
| | (Xφ)+(Dφ)→(A)1=101010(Q)1 | =101010 | |
| | Right 1(Dφ)=110101(D1) | =010101 | [1⊕1]=$\overline{\text{Sig.}}$ |
| | (Dφ)(D1)→AQ(A)2=110101(Q)2 | =010101 | |
| | Right 1(Dφ)=111010(D1) | =101010 | [0⊕1]Sig. |
| | (Xφ)=101010 | | |
| | 100100 (carry)+1 | | |
| | (Xφ)+(Dφ)=(A)3=100101(Q)3 | =101010 | |
| | Right 1(Dφ)=110010(D1) | =110101 | [1⊕1]=$\overline{\text{Sig.}}$ |
| | (Dφ)(D1)→AQ(A)4=110010(Q)4 | =110101 | |
| | Right 1(Dφ)=111001(D1) | =011010 | [0⊕1]=Sig. |
| | (Xφ)=101010 | | |
| | 100011 (carry)+1 | | |
| | (Xφ)+(Dφ)=(A)5=100100(Q)5 | =011010 | |
| | Right 1(Dφ)=110010(D1) | =001101 | [1⊕1]=$\overline{\text{Sig.}}$ |
| | (Xφ)(Dφ)→AQ(A)6=110010(Q)6 | =001101 | |
| | Right 1(Dφ)=111001(D1) | =000110 | |
| | (Xφ)(Dφ)→AQ(A)f=111001(Q)f | =000110 | Unconditional |

Finally, in Example IV a $-21_{10}$ is to be multiplied times the multiplicand of a $-21_{10}$. These two negative numbers, when multiplied together, will result in a positive product. The sign of the multiplier is trapped, and in this instance is a "1." This sign condition results in the "0" digits of the multiplier again being encoded as significant. It will be noted for the condition of the sign of the multiplier that $(\bar{y})$ is selected for transmission to $X\phi$. When "0" multiplier digits exist, the multiplicand $(X\phi)$ is the partial product and is added to the sum representing the partial products previously generated. This new sum is shifted right one position and a "0" digit is inserted in the most significant position of $D\phi$. For "1" multiplier digits, the previously generated sum represents the partial product and is shifted right one position, again with a "0" being inserted in the most significant position.

EXAMPLE IV $(y)=101010_2=-25_8=-21_{10}\,(Q)_i=101010_2=-25_8=-21_{10}$ $(y)(Q)=000110111001_2=671_8=441_{10}$

OPERATION

TRAP SIGN OF MULTIPLIER−(SQ)=1

SELECT $(\overline{y})=(X\phi)=010101_2$

| | | (Q)ᵢ | TEST SIGNIFICANCE |
|---|---|---|---|
| Initialize | Initial Sign to $(D\phi)=000000\,(D1)$ | $=101010$ | $[0\oplus 1]=$Sig. |
| | $(X\phi)=\underline{010101}$ | | |
| | $(X\phi)+(D\phi)=(A)_1=010101\,(Q)_1$ | $=101010$ | |
| | Right $1(D\phi)=001010\,(D1)$ | $=110101$ | $[1\oplus 1]=\overline{\text{Sig.}}$ |
| | $(D\phi)(D1)\rightarrow AQ\,(A)_2=001010\,(Q)_2$ | $=110101$ | |
| | Right $1(D\phi)=000101\,(D1)$ | $=011010$ | $[0\oplus 1]=$Sig. |
| | $(X\phi)=\underline{010101}$ | | |
| | $(X\phi)+(D\phi)=(A)_3=011010\,(Q)_3$ | $=011010$ | |
| | Right $1(D\phi)=001101\,(D1)$ | $=001101$ | $[1\oplus 1]=\overline{\text{Sig.}}$ |
| | $(D\phi)(D1)\rightarrow AQ\,(A)_4=001101\,(Q)_4$ | $=001101$ | |
| | Right $1(D\phi)=000110\,(D1)$ | $=100110$ | $[0\oplus 1]=$Sig. |
| | $(X\phi)=\underline{010101}$ | | |
| | $(X\phi)+(D\phi)=(A)_5=011011\,(Q)_5$ | $=100110$ | |
| | Right $1(D\phi)=001101\,(D1)$ | $=110011$ | $[1\oplus 1]=\overline{\text{Sig.}}$ |
| | $(D\phi)(D1)\rightarrow AQ\,(A)_6=001101\,(Q)_6$ | $=110011$ | |
| | Right $1(D\phi)=000110\,(D1)$ | $=111001$ | |
| | $(D\phi)(D1)\rightarrow AQ\ (A)_f=000110\,(Q)_f$ | $=111001$ | Unconditional |

SUMMARY

From a consideration of the described embodiment when taken in light of the numerical examples just discussed, it can be seen that the circuitry for selecting the appropriate form of the multiplicand prior to the execution of the multiply operation results in the desired advantage of always generating the appropriate sign and magnitude of the product. Further, it can be seen that it is never necessary to provide the complement of more than one of the operands. Accordingly, having fully described the operation of the invention, what is desired to be protected by Letters Patent is set for in the appended claims.

What is claimed is:

1. An improved arithmetic system for multiplying two signed binary numbers, and generating a product which is correct in both sign and magnitude, thereby requiring no product end-correction cycle, said system comprising:

receiving means for receiving a signed multiplicand operand, said multiplicand operand represented by a set of signals and said set of signals including a multiplicand sign-indicating signal;

multiplying means for forming the signed product of a signed multiplier operand represented by a second set of signals, said second set of signals including a multiplier sign value signal, and a received one of said signed multiplicand operands, and said multiplying means including means for storing said signed multiplier operand and the signals indicative of a selected form of said signed multiplicand operand;

sign-trapping means responsibly coupled to said multiplying means for sensing and at least temporarily storing said multiplier sign value signal of said multiplier operand; and operand-select means coupled to said receiving means and responsively coupled to said sign-trapping means for predetermining said signals indicative of the form of the multiplicand operand to be transmitted to said multiplying means, wherein said operand-select means includes first multiplicand form selection means for selecting the true value form of said set of signals of said multiplicand operand in response to a first of said multiplier sign value signals, and second multiplicand form selection means for selecting the complement value form of said set of signals of said multiplicand operand in response to a second of said multiplier sign value signals, the selected one of said predetermined forms of said multiplicand operand, the value of said multiplier operand, and said multiplier sign value signal in combination determining the correct sign and magnitude of the product without necessity of product end-correction.

2. A multiplying system as in claim 1 and further including encoding significance-detecting means coupled to said sign-trapping means and to said multiplying means for determining the significance of each of the digits of said multiplier operand and for each digit position alternatively providing to said multiplying means a first signal indicative of said significance for causing said multiplying means to form a partial product or a second signal indicative of the lack of said significance for causing said multiplying means to advance to the next one of said multiplier digits.

3. A multiplying system as in claim 2 wherein said first multiplicand form selection-means includes a plurality of gate circuits, each of said gate circuits for receiving a corresponding ordered true digit signal value of said multiplicand operand and collectively enabled by said first of said multiplier sign value signals, and said second multiplicand form selection means includes a like plurality of gate circuits, each of said gates in said like plurality of gate circuits for receiving a correspondingly ordered complement digit signal value of said multiplicand operand and collectively enabled by said second of said multiplier sign value signals.

4. A multiplying system as in claim 2 wherein said significance-detecting means includes an Exclusive-OR circuit, said Exclusive-OR circuit including first input means for receiving the true value of said trapped multiplier sign value signal and the multiplier digit representing signal being tested, and second input means for receiving the complement value of said trapped multiplier sign value signal and said digit, first output means for providing said second signal as a transferable signal when said sign and said digit have a first comparison relationship; and second output means for providing said first signal as a partial-product forming enable signal when said sign and said digit have a second comparison relationship.

5. An improved multiplier for forming the product of two signed binary numbers wherein the product is correct in both sign and magnitude and is formed in a plurality of iterative cycles without requiring an end-correction, and a negative number is the ones complement of the positive number, in combination: receiving means for receiving a first set of signals indicative of the true values of the digits of a multiplicand and a second set of signals indicative of the complement values of the digits of a multiplicand; first register means for initially storing the signals indicative of the digits of the multiplier, said multiplicand and said multiplier each including sign-indicating signals; second register means, said first and second register means for storing partial products during each iteration cycle and the final signed product at the completion of the multiply operation; sign-trapping means coupled to said first register for trapping and storing the signal indicative of the sign of said multiplier, said sign-trapping means including first output means for providing a signal indicative of the true multiplier sign and second output means for providing a signal indicative of the complement multiplier sign; multiplicand form-selection means coupled to said receiving means and coupled to said sign-trapping means for each digit position alternatively selecting the true value of said multiplicand when said multiplier sign is positive and the complement value of said multiplicand when said multiplier sign is negative; third register means coupled to said form-selection means for storing the selected form of said multiplicand; fourth and fifth auxiliary register means; adder means coupled to said third register means and said fourth auxiliary register means for generating partial sums during ones of said interative cycles; multiplier digit significance determining means coupled to a predetermined digit position of said fifth auxiliary register means and to said sign-trapping means for alternatively providing a significant signal when said multiplier digit has a first predetermined relation to said trapped multiplier sign and for providing a non-significant signal when said multiplier digit has a second predetermined relation to said trapped multiplier sign; transfer gate means coupled to said fourth auxiliary register means and to said digit significance determining means for transferring the value stored in said fourth auxiliary register means to said second register means in response to said non-significant signal; add gate means coupled to said adder means and to said digit significance determining means for transferring said sum to said second register means in response to said significant signal; means for coupling the output of said fifth auxiliary register means to the input of said first register means; and control means coupled to said fifth and fourth auxiliary register means for causing the values stored in said first and second register means to be shifted one digit position and transferred to said fifth and fourth auxiliary register means for permitting sequential sensing of significance of the digits of said multiplier, said control means including means for terminating the multiply operation after a predetermined number of iterative cycles.

6. The combination of claim 5 and further including initializing means coupled to said control means, and said third register means for setting the sign of the value stored in said third register means in all stages of said fourth auxiliary register means prior to initiation of said iterative cycles, and sign-fill means coupled to said control means and said third register means for setting the most significant digit position of said fourth auxiliary register means to the value of the sign of the value stored in said third register means during each of said iterative cycles.

7. The combination of claim 5 wherein said multiplier digit significance determining means comprises an Exclusive-OR circuit for providing said significant signal when said trapped sign differs from the multiplier digit whose significance is being determined and said non-significant signal when said trapped sign is like the multiplier digit whose significance is being determined.

References Cited

UNITED STATES PATENTS

| | | | |
|---|---|---|---|
| 3,372,269 | 3/1968 | MacSorley et al. | 235—164 |
| 3,290,493 | 12/1966 | Githens et al. | 235—164 |

OTHER REFERENCES

Ivan Flores: The Logic of Computer Arithmetic, 1963, pp. 46–50.

MALCOLM A. MORRISON, Primary Examiner

D. H. MALZAHN, Assistant Examiner

UNITED STATES PATENT OFFICE

CERTIFICATE OF CORRECTION

Patent No. 3,519,809 July 7, 1970

Gary J. Iverson et al.

It is certified that error appears in the above identified patent and that said Letters Patent are hereby corrected as shown below:

In the heading to the drawings, and printed specification, in the title "ROTATION", each occurrence, should read -- NOTATION --. Column 15, line 67, "responsibly" should read -- responsively --. Column 16, line 46, "transferable" should read -- transfer-enable --. Column 17, line 8, "interative" should read -- iterative --.

Signed and sealed this 16th day of February 1971.

(SEAL)
Attest:

Edward M. Fletcher, Jr.
Attesting Officer

WILLIAM E. SCHUYLER, JR.
Commissioner of Patents